Patented Sept. 29, 1925.

1,555,119

UNITED STATES PATENT OFFICE.

PEHR JOHANSON AND CLARENCE B. TILTON, OF WORCESTER, MASSACHUSETTS, ASSIGNORS TO NORTON COMPANY, OF WORCESTER, MASSACHUSETTS, A CORPORATION OF MASSACHUSETTS.

SILICATE BONDED ABRASIVE ARTICLES AND PROCESS OF MAKING THE SAME.

No Drawing.   Application filed November 8, 1920. Serial No. 422,534.

*To all whom it may concern:*

Be it known that we, PEHR JOHANSON and CLARENCE B. TILTON, citizens of the United States of America, residing at Worcester, in the county of Worcester and State of Massachusetts, have invented certain new and useful Improvements in Silicate Bonded Abrasive Articles and Processes of Making the Same, of which the following is a full, clear and exact specification.

Our invention relates to articles made of bonded granular material and more particularly to such articles as abrasive grinding wheels which comprise hard crystalline material bonded by means of a silicate, and to a process of producing the same.

In making such bonded articles, the usual procedure involves mixing the abrasive grains with liquid sodium silicate and heat setting the bond. This sodium silicate of commerce is ordinarily made by fusing silica, such as finely pulverized sand, with sodium carbonate to form a glass, which is crushed and digested in an autoclave under steam pressure in order to produce an aqueous solution of the sodium silicate. This solution is diluted to a strength of 42° to 60° Baumé for use as a grinding wheel bond. After mixing the desired proportions of abrasive and liquid, the mixture is tamped into a mold and the resulting article is then subjected to the standard heat treatment at a temperature not over 250° centigrade. By means of this process it has heretofore been impossible to produce porous articles sufficiently hard for desired purposes and particularly free cutting grinding wheels of open structure which would compare in grades of hardness and cutting characteristics with those containing clay bonds fired at a temperature of Seger cone 12 for several days to vitrify the bond.

It is accordingly an object of our invention to produce a harder bonded article containing abrasive grains than heretofore obtainable by the use of a silicate bond heat set at a low temperature.

A further object is to provide an abrasive article of an open porous structure which is free cutting when used as a grinding wheel and which may be made in a range of hardness equal to the harder grades of grinding wheels containing a vitrified clay.

A further object is to provide a new, simplified and economical process of making such silicate bonded abrasive articles under conditions insuring desired grades of hardness and uniformity in physical characteristics.

Further objects will be apparent in the following disclosure to one skilled in this art and the nature and scope of this invention will be pointed out and specifically covered by the claims appended to this specification.

In accordance with this invention, we have found it desirable to employ dry sodium silicate or its equivalents and to substitute it for a part or the whole of the liquid silicate heretofore used and preferably to increase the silicate content in the bond by the addition of this powdered glassy material to the dissolved silicate.

If we use over 10% and preferably from 12 to 15% and even higher amounts of sodium silicate, we obtain abrasive wheels of the harder grades and these may be made harder than the low burned silicate wheels heretofore obtainable.

While the invention is not limited to any particular abrasive material, the ones usually employed for grinding wheels or tiles are silicon carbide and crystalline alumina, such as corundum and electrically fused alumina, and the procedure is varied depending upon the type of abrasive used. In general, we employ a bond comprising dry sodium silicate which is set by the application of heat below the fusion point of the silicate. In order to produce a bonded article of abrasive grains, we mix the dry silicate with the abrasive and incorporate therewith a sufficient amount of a binder adapted to make the mass moldable and to hold it together during the firing operation, such as a solution of sodium silicate, the relative proportions of these ingredients depending upon the type of wheel required. We may add thereto various metallic oxides, such as zinc oxide, which give the mass a preliminary set, and, if desired, employ various fillers which are substantially inert at the temperature of maturing the bond but aid in making the mixture workable. An example of such inert fillers is a combination of feldspar and stoneware clay.

A grinding wheel of bonded crystalline alumina may be made in grades harder than those heretofore obtainable by the regular silicate processes, which do not involve the use of the dry silicates, by employing the following ingredients in the proportions specified, these values depending upon the size of grain used and the bond hardness desired.

|  | Per cent by weight. |
|---|---|
| Crystalline alumina grain | 65 to 80 |
| Liquid sodium silicate | 13 to 7 |
| Dry sodium silicate | 10 to 6 |
| Feldspar | 6 to 4 |
| Clay | 3 to 2 |
| Zinc oxide | About 1 |

The liquid silicate employed analyzes about 36% $SiO_2$, 18% $Na_2O$ and 46% $H_2O$ and has a specific gravity of about 60° Baumé. Softer grades of bonded structure may be made by varying these ingredients and their proportions, as is understood by one skilled in this art.

This article may be made by mixing the dry materials and thereafter adding hot liquid sodium silicate in sufficient quantity to permit the article to be tamped in a mould to a dense and hard mass, in accordance with the usual procedure, although we may desire to dilute the silicate and obtain a more plastic article, for the harder grades. The molded form is then heated in a steam box to set the sodium silicate, the temperature being at least 100° C. and preferably between 210° and 250° C. It is desirable that the liquid silicate be initially heated to aid in the reaction, this heat treatment, however, not being strictly necessary to produce satisfactory results.

Silicon carbide stones or wheels may be formed of the above ingredients in the proportions specified but the liquid silicate should be added to the mixture in a cold condition and be more dilute than that ordinarily used for making the fused alumina wheels, (i. e. from 42° to 58° Bé.) so that upon tamping the mass a rubbery condition is obtained as distinguished from the dense mass tamped to a hard condition, heretofore considered essential to the production of a hard bonded article by the usual methods. The general procedure involved in making these articles may be along the lines described above in connection with the use of crystalline alumina, except that the liquid silicate is not initially heated since decomposition of the silicon carbide granules would begin too soon and could not be made use of during the setting of the bond. Furthermore, the tamped wheel is clamped between plates before being heat treated or is otherwise subjected to pressure during the heating operation to keep it from swelling or changing from its original shape and dimensions.

If a sodium silicate solution is used alone as the bond, it is found that the addition of too much silicate causes the mass to swell to a detrimental extent during the drying operation, due possibly to the formation of a skin over the outer zone which prevents the egress of water. By using part of the water soluble glass bond in the dry form, we are able to increase the silicate content materially without causing this undesirable result. The dry silicate may dissolve somewhat in the liquid present before the molding operation, but such solution as may take place is insufficient to seriously affect the workability of the mass.

Therefore, in accordance with our invention, we are enabled to use more sodium silicate as a bond for abrasive grains than the 10% by weight heretofore considered advisable and feasible and to employ from 12 to 15% and more of the silicate and thereby obtain a harder tile or wheel than is possible with a low fired bond of liquid silicate. As a result, the simple, inexpensive and expeditious silicate method of bonding may be employed in a much wider field for the production of tiles, wheels and similar articles which previously had to be made by a laborious and costly procedure. It of course is obvious that the chemical equivalents of the materials may be utilized.

Having thus described our invention, what we claim as new and desire to secure by Letters Patent is:

1. A bonded article of granular material and a bond comprising dry sodium silicate and liquid sodium silicate set by the application of heat without fusion thereof, said silicate content forming more than 10% by weight of the total mass.

2. As an article of manufacture, a bonded mass of abrasive material and a bond integrally uniting the same comprising dry sodium silicate, liquid sodium silicate and a filling set by the application of heat without fusion of the bond, said bond content forming more than 10% by weight of the total mass.

3. As an article of manufacture, a bonded mass of abrasive material and a bond comprising dry sodium silicate, liquid sodium silicate and a metallic oxide which gives a preliminary set to the mass, said bond having been set by heat without fusion of the silicate.

4. As an article of manufacture, a bonded mass of abrasive material and a bond, comprising sodium silicate in excess of 15% by weight of the total mass, a filler, and zinc oxide which has been heat set without fusion of the silicate.

5. An article of manufacture having an open, porous structure which is cool cutting and of a hard grade, comprising abrasive grain and a bond which has been set by the application of heat at a temperature from 100° C. to 250° C., said ingredients being proportioned substantially as follows:

| | Per cent by weight. |
|---|---|
| Abrasive grain | 65 to 80 |
| Liquid sodium silicate | 13 to 7 |
| Dry sodium silicate | 10 to 6 |
| Clay material | 9 to 6 |
| Zinc oxide | 1 to 3 |

6. As an article of manufacture, a bonded mass of abrasive grains and a bond comprising sodium silicate in excess of 15% by weight of the total mass which has been heat set without fusion thereof.

7. An abrasive article comprising abrasive grains bonded with dry sodium silicate and liquid sodium silicate set at a temperature below the fusing point of the silicate.

8. The process of making a bonded abrasive article which comprises mixing granular abrasive material with pulverized sodium silicate, incorporating therewith a liquid agent capable of rendering the mixture workable, working the plastic mass thus formed into the desired shape, and thereafter setting the mass by appropriately heating to a temperature below the fusion point of the silicate.

9. The process of making a bonded article comprising mixing abrasive material with pulverized sodium silicate liquid sodium silicate in excess of 12% by weight of the total mass, moulding an article therefrom and heat setting the silicate without fusion thereof to unite the abrasive granules.

10. The process of making a bonded article of abrasive material, comprising mixing said material with powdered sodium silicate in dry condition a filler and liquid sodium silicate to form a moldable mass having a high silicate content above 10% by weight of the total mass, moulding the same into a desired form and thereafter heat setting the silicate at a temperature in excess of 100° C. but below the fusion point thereof.

11. The process of making a bonded article of granular abrasive material, comprising mixing said material with a metallic oxide setting material and dry sodium silicate, forming a moldable mass therewith by adding liquid sodium silicate, shaping the same in desired form and thereafter heat setting the silicate at a temperature between 100° C. and 250° C.

12. The process of making a bonded article, comprising mixing abrasive granules with powdered sodium silicate, zinc oxide and clay material, incorporating liquid sodium silicate therewith in amount sufficient to produce a viscous mass capable of being tamped in a mold, tamping said material in a mold to form a shaped article and thereafter heating between 100° C. and 250° C. to set the bond.

13. The process of making a bonded article including the steps of mixing silicon carbide abrasive grains with a bond comprising dry sodium silicate and liquid sodium silicate proportioned to form a workable mass, shaping a molded article therefrom, confining the article to prevent deformation during heating, and heat setting the bond without fusing the silicate.

14. The method of making a bonded article, comprising mixing silicon carbide grains with a dry material containing powdered sodium silicate, incorporating a liquid sodium silicate therewith in amount sufficient to form a rubbery mass upon tamping, tamping said mixture in a mold to produce said rubbery condition and form a shaped article and thereafter heat setting the bond at a temperature between 100° C. and 250° C.

15. The method of making a bonded article, comprising mixing silicon carbide grains with a dry material containing powdered sodium silicate and zinc oxide, incorporating a liquid sodium silicate therewith in amount sufficient to form a rubbery mass upon tamping, tamping said mixture in a mould to produce said rubbery condition and form a shaped article, and thereafter heating the article at a temperature between 100° C. and 250° C. and under the application of pressure to bond the silicon carbide grains.

16. The method of making a bonded article comprising the steps of mixing the following ingredients within the following proportions:

| | Per cent by weight. |
|---|---|
| Abrasive grain | 65 to 80 |
| Liquid sodium silicate | 13 to 7 |
| Dry sodium silicate | 10 to 6 |
| Clay material | 9 to 6 |
| Zinc oxide | 1 to 3 | thereafter shaping an article from said ingredients and then heat setting the mass by the application of heat at a temperature between 100° C. and 250° C.

Signed at Worcester, Massachusetts, this 5th day of Nov., 1920.

PEHR JOHANSON.
CLARENCE B. TILTON.